H. J. GILBERT.
BUSHING.
APPLICATION FILED FEB. 8, 1904.
907,988.
Patented Dec. 29, 1908.
2 SHEETS—SHEET 1.
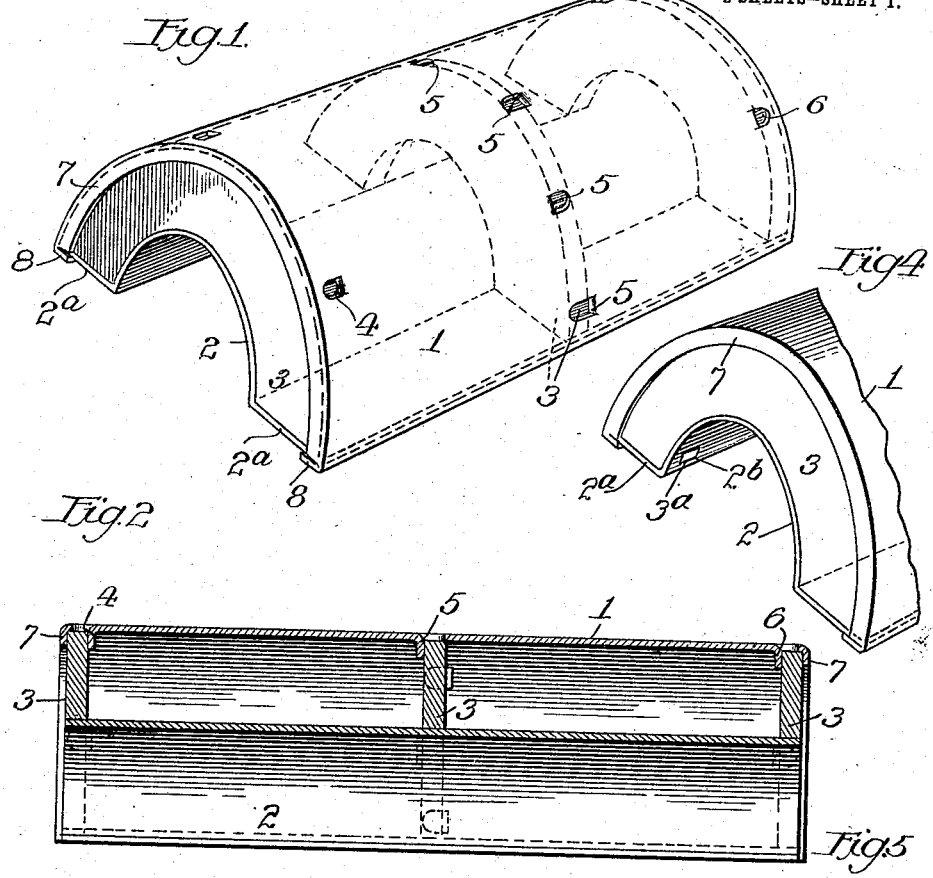
Witnesses:
Edw. P. Barrett
Luth S. Alter
Inventor
Henry J. Gilbert
By Rector & Hibben
his Attorneys

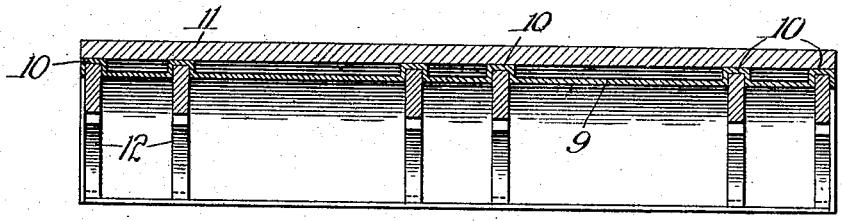
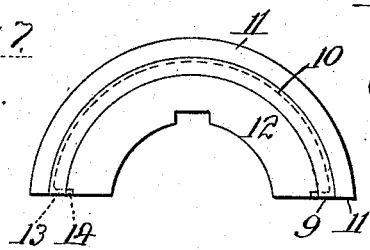
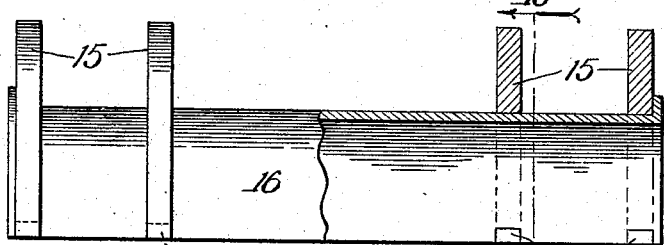
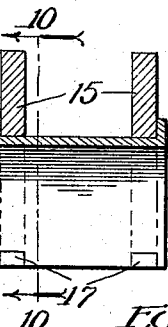
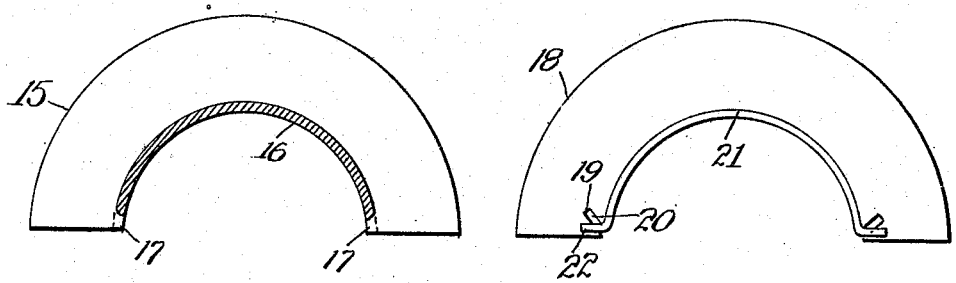
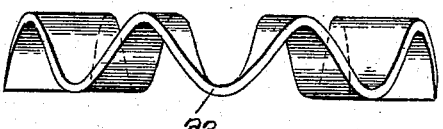

UNITED STATES PATENT OFFICE.

HENRY J. GILBERT, OF SAGINAW, MICHIGAN.

BUSHING.

No. 907,988. Specification of Letters Patent. Patented Dec. 29, 1908.

Application filed February 8, 1904. Serial No. 192,700.

*To all whom it may concern:*

Be it known that I, HENRY J. GILBERT, a citizen of the United States, residing at Saginaw, Saginaw county, Michigan, have invented certain new and useful Improvements in Bushings, of which the following is a description.

My invention pertains to bushings which are used for various purposes particularly, but not necessarily, in connection with pulleys and the like where interchangeable bushings are required to fit and clamp a pulley of any given shaft bore or opening upon a shaft of any diameter less than that of such shaft bore.

The object of my invention is to provide a simple and efficient but durable and comparatively inexpensive bushing formed of sheet metal, the features of advantage and utility of which will be made apparent from the description hereinafter given.

In the drawings, Figure 1 is a perspective view of one of the halves of my new bushing in which the rings are retained or held at both inner and outer edges; Fig. 2 a central longitudinal section thereof; Fig. 3 an end elevation of such half bushing; Fig. 4 a detail view showing the interlocking between the sleeve and rings; Fig. 5 an elevation of the end of a modified form of bushing, illustrating how certain features may be dispensed with when interlocking of the inner edges of the rings is employed; Fig. 6 a longitudinal sectional view of a modified form of bushing in which the rings are held at their outer edge, Fig. 7 an end elevation of such modified form; Fig. 8 a detail view of parts of Figs. 6 and 7; Fig. 9 an elevation, partly in section, of a modified form of bushing in which the rings are retained or held at their inner edges; Fig. 10 a sectional elevation on the line 10—10 of Fig. 9; Fig. 11 an elevation of a form of bushing modified as to the construction of internal thimble or sleeve; and Fig. 12 an elevation of a corrugated form of ring.

My bushing is particularly applicable to pulleys and the like and especially to those of the split type, and hence my bushing is here shown and described as made in halves adapted to fit or be inserted within the usual shaft bore or opening of a pulley whereby the latter may be clamped to any sized shaft having a diameter less than the shaft opening.

Referring to Figs. 1 to 5, the half bushing therein illustrated comprises a half shell 1 forming the outer bearing surface of the bushing; an inner sleeve 2 forming the inner bearing surface, and a series of substantially semi-circular rings 3, arranged and retained between such shell and sleeve in the manner hereinafter explained.

In order to hold or retain the rings in proper relative position, which is preferably at right angles to the axis of rotation as shown, I employ in the present instance (Figs. 1 to 3), means coöperating with both their inner and outer edges. To this end I cut or stamp a series of tongues 4, 5 and 6 from the body of the outer shell 1 and bend them inwardly at right angles to the shell. A single line of the tongues 4 and 6 is provided while a double line of tongues 5, in staggered relation, is provided, with the result that the rings are interlocked as to their outer edges with the shell, the middle ring being held between the opposing tongues 5 against displacement longitudinally of the bushing, while the end rings as to their outer edges are held between their single line of tongues 4 and 6 respectively and inwardly directed end flanges 7 of the shell 1.

While a bushing composed of two halves constructed according to the description thus far given, without the sleeve 2, might be employed to advantage with the inner edges of the rings forming bearing surfaces by being in immediate contact with the shaft itself, and might be found quite satisfactory in practice, yet I prefer to use such sleeve 2, inasmuch as it constitutes means for supporting and steadying the inner edges of the rings, and also, if desired, retaining means by being interlocked with the inner edges or ends of the rings. As herein shown, this sleeve 2 is a shell substantially semi-circular, conforming to the contour or semicircle of the inner bearing edges of the rings, and concentric to the shell. The series of rings is saddled upon the sleeve which is provided with radial flanges $2^a$ on which the ends of the rings or half rings 3 rest and which correspond thereto in width, all as clearly indicated in Fig. 1. Thus the sleeve itself is, in this particular instance, the part which fits directly upon the shaft.

The material of the shell is of somewhat greater length than required to form the substantially semi-circular shell itself and its extended longitudinal edges 8 are inturned or folded beneath the flanges of the sleeve 2 after such sleeve and rings have been properly assembled within the shell in the manner hereinbefore described, with the result that the parts composing the half bushing are securely retained in place so that such half bushing constitutes units which may be readily and quickly handled and put in place or removed by the operator or user.

In addition to the anchorage of the rings at their outer edges, the rings may if desired or required be held or retained at their inner edges, but such additional anchorage is not necessary, as the bushing constructed as already described represents an efficient and serviceable structure. In the present instance the means for retaining the inner edges consists of an interlocking connection comprising a series of lugs or ears 3ª arranged on the inner corners of the half rings and projecting inwardly in the manner illustrated in Fig. 4. The sleeve 2 is notched or recessed at intervals at 2ᵇ in order to receive such ears, with the result that the rings are firmly saddled upon the sleeve and securely held in proper position.

When the inner edges of the rings are thus retained and held, as described, the flanges 2ª of the sleeve become non-essential and may be dispensed with, as indicated in Fig. 5 of the drawing. Likewise the end flanges 7 of the shell 1 may be omitted.

In Figs. 6, 7 and 8 I have shown a modified form of construction as regards the means for holding or retaining the outer and inner edges of the rings. In such modified form, which is also shown of the split type of bushing, a thin shell of sheet metal 9 is circumferentially expanded at desired intervals, forming circumferential ribs 10 bearing against the inner face of an ordinary hub thimble 11 and also forming circumferential grooves or channels on the inner face of the shell to receive the outer edges of a series of rings 12, here six in number, which number may be varied as required or desired. These grooves hold the rings against displacement from their proper relative position, which by preference is parallel to each other and at right angles to the bushing axis or axis of rotation of the shaft. To support the lower ends of the half rings, if desired, the longitudinal edges of the shell 9 are provided with a series of tongues or ears 13 corresponding to the rings in position and adapted to be inwardly folded or bent underneath the rings to thereby support them. By preference, the outer corners of the rings are notched at 14, sufficiently to receive the tongues or ears 13, so that when the latter are folded, as described, a flush surface will be presented on the lower edge of the rings.

In Figs. 9, 10 and 11 I have shown a modified form of bushing in which the inner edges only of the rings are retained or held. Referring to Figs. 9 and 10, the rings 15 are saddled upon an inner half sleeve or shell 16, which is provided along its longitudinal edges with a series of notches arranged to receive inwardly directed ears 17. The rings are sprung onto the shell 16 and securely retained thereon through the interlocking arrangement described. The construction shown in Fig. 11 involves somewhat of a reversal of the interlocking arrangement illustrated in Figs. 9 and 10, inasmuch as the rings 18 are provided at their inner corners with oblique slots 19 adapted to receive tongues 20 formed on the longitudinal edges of the inner sleeve 21, corresponding to the other sleeves described. In practice, these edges are flanged outwardly and upwardly corresponding to the inclination of the slots 19 and the same are also slit at intervals to form tongues of the same width as the rings and corresponding thereto in location. The sleeve is then put in place with the tongues of the flanges inserted in the slots 19, after which those alternating portions 22 of the flanges between the rings are bent or folded down flat to the position indicated in Fig. 11, the tongues remaining in original position engaged by the slots 19.

My bushings are particularly applicable to pulleys of the split type, and therefore my bushings have been illustrated and described as made in two halves, although they may be made as a single structure, in which form they find useful application as bushings for loose pulleys.

As hereinbefore stated, the parts of the half bushings are substantially semi-circular in cross-section and in fact are less than a semi-circle, so that two coöperating halves will not come in contact when the pulley or the like is clamped to a shaft.

The bushing may be provided with any desired number of rings and may be of any desired or required length according to the width of the pulley hub or according to other considerations. Furthermore, while flat rings are preferred, corrugated rings 23, as shown in Fig. 12, may be employed.

It will be understood that various mechanical changes may be made in respect to the precise form and construction illustrated and described without departing from the spirit and scope of my invention and claims.

I claim:

1. A bushing comprising a series of rings, and means coöperating with the outer edges of said rings to maintain them in proper relative position; substantially as described.

2. A bushing comprising a series of rings, and means coöperating with the outer edges of such rings for both spacing and retaining them in their proper relative position; substantially as described.

3. A bushing comprising a series of rings, and means coöperating with both the outer and inner edges of said rings for retaining them in proper relative position; substantially as described.

4. A bushing comprising a series of rings, means coöperating with the outer edges of such rings for spacing and retaining them, and means coöperating with the inner edges of said rings for retaining or holding them as to such edges; substantially as described.

5. A bushing comprising a series of rings, and means coöperating with the inner edges of such rings for retaining them and to thereby hold them in proper relative position; substantially as described.

6. A bushing comprising a series of sheet metal rings arranged parallel to each other, and means coöperating with the outer edges of such rings for holding them in proper relative position; substantially as described.

7. A bushing comprising a series of sheet metal rings arranged parallel to each other, and means coöperating with the outer edges of such rings for holding them in proper relative position, said rings being arranged at right angles to the bushing axis; substantially as described.

8. A bushing comprising a series of sheet metal rings arranged parallel to each other and at right angles to the bushing axis, and means coöperating with the inner and outer edges of such rings for holding them in proper relative position; substantially as described.

9. A bushing comprising a series of rings arranged at an angle to the bushing axis, and a shell confined within which such rings are held; substantially as described.

10. A bushing comprising a series of rings arranged at an angle to the bushing axis with their edges directed towards such axis, and a shell receiving said rings and having means for retaining them in proper relative position; substantially as described.

11. A bushing comprising a series of rings arranged parallel to each other with their edges at substantially right angles to the bushing axis, and an outer shell receiving such rings and having means for retaining them in place; substantially as described.

12. A bushing comprising a series of rings arranged parallel to each other and at substantially right angles to the bushing axis, and an outer shell receiving such rings and having means for retaining them in place, such means consisting of a series of ears in the interior of the shell against which such rings bear; substantially as described.

13. A bushing comprising a series of rings arranged parallel to each other and at substantially right angles to the bushing axis, and an outer shell receiving such rings and having means for retaining them in place, such means consisting of a series of tongues or ears extending from the body of the shell and inwardly folded and against which such rings bear; substantially as described.

14. A bushing comprising a series of rings arranged parallel to each other and at substantially right angles to the bushing axis, and an outer shell receiving such rings and having means for retaining them in place, such means consisting of a series of ears in the interior of the shell against which such rings bear, the ends of the shell being inwardly flanged against the outermost rings; substantially as described.

15. A bushing comprising a series of rings arranged parallel to each other and at substantially right angles to the bushing axis, and an outer shell receiving such rings and having means for retaining them in place, the ends of the shell being inwardly flanged against the outermost rings; substantially as described.

16. A bushing comprising a series of rings arranged parallel to each other and at an angle to the bushing axis, and means coöperating with their inner edges for holding them in proper relative position; substantially as described.

17. A bushing comprising a series of rings arranged at an angle to the bushing axis and means coöperating with their inner edges for spacing them and holding them in proper relative position; substantially as described.

18. A bushing comprising a series of rings arranged at an angle to the bushing axis, and a sleeve having interlocking engagement with the rings; substantially as described.

19. A bushing comprising a series of rings arranged at an angle to the bushing axis, and an inner sleeve on which the rings are saddled and which has interlocking engagement with the inner edges of the rings; substantially as described.

20. A bushing comprising a series of rings arranged at an angle to the bushing axis and provided with ears or tongues, and an inner sleeve having recesses or notches to receive such ears; substantially as described.

21. A bushing comprising a series of flat sheet metal rings arranged parallel to each other and at right angles to the bushing axis, and an inner sleeve having interlocking connection with the rings; substantially as described.

22. A split bushing, each half of which comprises a series of rings, and a substantially semi-circular shell receiving such rings and inturned as to its longitudinal edges to support the inner ends of such rings; substantially as described.

23. A split bushing, each half of which comprises a series of rings arranged parallel to each other and at substantially right angles to the bushing axis, and a substantially semi-circular shell receiving such rings and having its longitudinal edges inwardly flanged to support the ends of such rings; substantially as described.

24. A split bushing, each half of which comprises a series of rings arranged parallel to each other and at substantially right angles to the bushing axis, and a substantially semi-circular shell receiving such rings, and having its longitudinal edges inwardly flanged to support the ends of such rings, and having its ends inwardly flanged against the outermost rings; substantially as described.

25. A bushing comprising an outer shell, a sleeve, and a series of rings arranged between such shell and sleeve and at right angles to the bushing axis; substantially as described.

26. A bushing comprising an outer shell, a sleeve, and a series of rings arranged parallel to each other between such shell and sleeve and at right angles to the bushing; substantially as described.

27. A bushing comprising an outer shell, an inner sleeve, a series of rings arranged between such shell and sleeve, and means for retaining the rings in place; substantially as described.

28. A bushing comprising an outer shell, an inner sleeve, and a series of rings arranged between such shell and sleeve, said shell having means for engaging and holding the outer edges of such disks; substantially as described.

29. A bushing comprising an outer shell, an inner sleeve, and a series of rings arranged between such shell and sleeve, said shell having interlocking connection with the rings; substantially as described.

30. A bushing comprising an outer shell, an inner sleeve, and a series of rings arranged between such shell and sleeve, said sleeve having means for engaging and holding the inner edges of such rings; substantially as described.

31. A bushing comprising an outer shell, an inner sleeve, and a series of rings arranged between such shell and sleeve, said sleeve having interlocking connection with the rings; substantially as described.

32. A bushing comprising an outer shell, an inner sleeve, and a series of rings having interlocking connection with both the shell and sleeve; substantially as described.

33. A bushing comprising an outer shell, an inner sleeve, concentric to the shell, and a series of rings located between the shell and sleeve and arranged parallel to each other and at right angles to the bushing axis; substantially as described.

34. A split bushing, each half of which comprises an outer shell substantially semi-circular in section and having its longitudinal edges infolded, a sleeve having flanges resting upon such shell flanges, and a series of rings arranged between such shell and sleeve and at an angle to the bushing axis; substantially as described.

35. A split bushing, each half of which comprises an outer shell having its ends and longitudinal edges inwardly flanged, an inner sleeve concentric to such shell and having radial flanges resting upon the longitudinal flanges of the shell, and a series of rings arranged between the shell and sleeve and at an angle to the bushing axis; substantially as described.

HENRY J. GILBERT.

Witnesses:
H. MEAD HAMMOND,
ARNOLD BOUTELL.